United States Patent
Meeks

(10) Patent No.: US 6,755,479 B1
(45) Date of Patent: Jun. 29, 2004

(54) TRAILER WITH TILTING BED

(76) Inventor: T. Wayne Meeks, P.O. Box 1115, Seneca, SC (US) 29679

( * ) Notice: Subject to any disclaimer, the term of this patent is extended or adjusted under 35 U.S.C. 154(b) by 48 days.

(21) Appl. No.: 10/135,484

(22) Filed: Apr. 30, 2002

(51) Int. Cl.[7] .................................................. B60P 1/04
(52) U.S. Cl. .................... 298/17 SG; 298/5; 298/17 B; 298/20 R; 298/38
(58) Field of Search .......................... 298/17 B, 17 SG, 298/5, 10, 20 R, 38; 414/437, 482, 483, 485; 280/47.12

(56) References Cited

U.S. PATENT DOCUMENTS

| | | | |
|---|---|---|---|
| 1,894,320 A | | 1/1933 | Muchenberger-Wittlinger |
| 2,189,079 A | * | 2/1940 | Mueller et al. ................ 298/2 |
| 2,570,334 A | * | 10/1951 | Erjavec |
| 3,189,387 A | | 6/1965 | Nieto, Jr. |
| 3,260,547 A | | 7/1966 | Heilig et al. |
| 3,450,281 A | * | 6/1969 | Groberg |
| 3,578,806 A | * | 5/1971 | Tonelli ............................ 298/2 |
| 4,394,105 A | | 7/1983 | Mitchell |
| 4,511,181 A | | 4/1985 | Schantz |
| 4,711,499 A | | 12/1987 | Fortin |
| 4,889,390 A | * | 12/1989 | Campbell ....................... 298/5 |
| 5,395,163 A | * | 3/1995 | Mandell et al. ................ 298/38 |
| 5,544,944 A | | 8/1996 | Keech |
| 6,238,166 B1 | | 5/2001 | Collier |
| 6,290,301 B1 | * | 9/2001 | Bockman ....................... 298/5 |
| 6,318,808 B1 | * | 11/2001 | Shayne ..................... 298/17 B |

* cited by examiner

*Primary Examiner*—Stephen T. Gordon
(74) *Attorney, Agent, or Firm*—Leatherwood Walker Todd & Mann, P.C.; Thomas W. Epting

(57) ABSTRACT

A trailer for attachment to a hitch of a tow vehicle, the trailer comprising a bed, or some other type of load carrying portion, connected for pivotal movement with respect to the draw bar of the trailer. The bed is movable between a generally horizontal, hauling position and a tilted, dumping position. The bed includes a forward portion adjacent the draw bar and a rearward portion opposite the forward portion. An axle is connected to the bed to which wheels are attached. Blocking members contact the axle as the tow vehicle moves rearwardly, the blocking members being movable between a blocking position, for contacting the ground to substantially block rearward movement of the bed as the trailer is moved rearwardly, and a retracted position, wherein the blocking members are substantially out of contact with the ground. Upon the blocking member being moved to the blocking position and the bed being in the hauling position, and upon the trailer being moved rearwardly, the bed pivots to the dumping position.

17 Claims, 8 Drawing Sheets

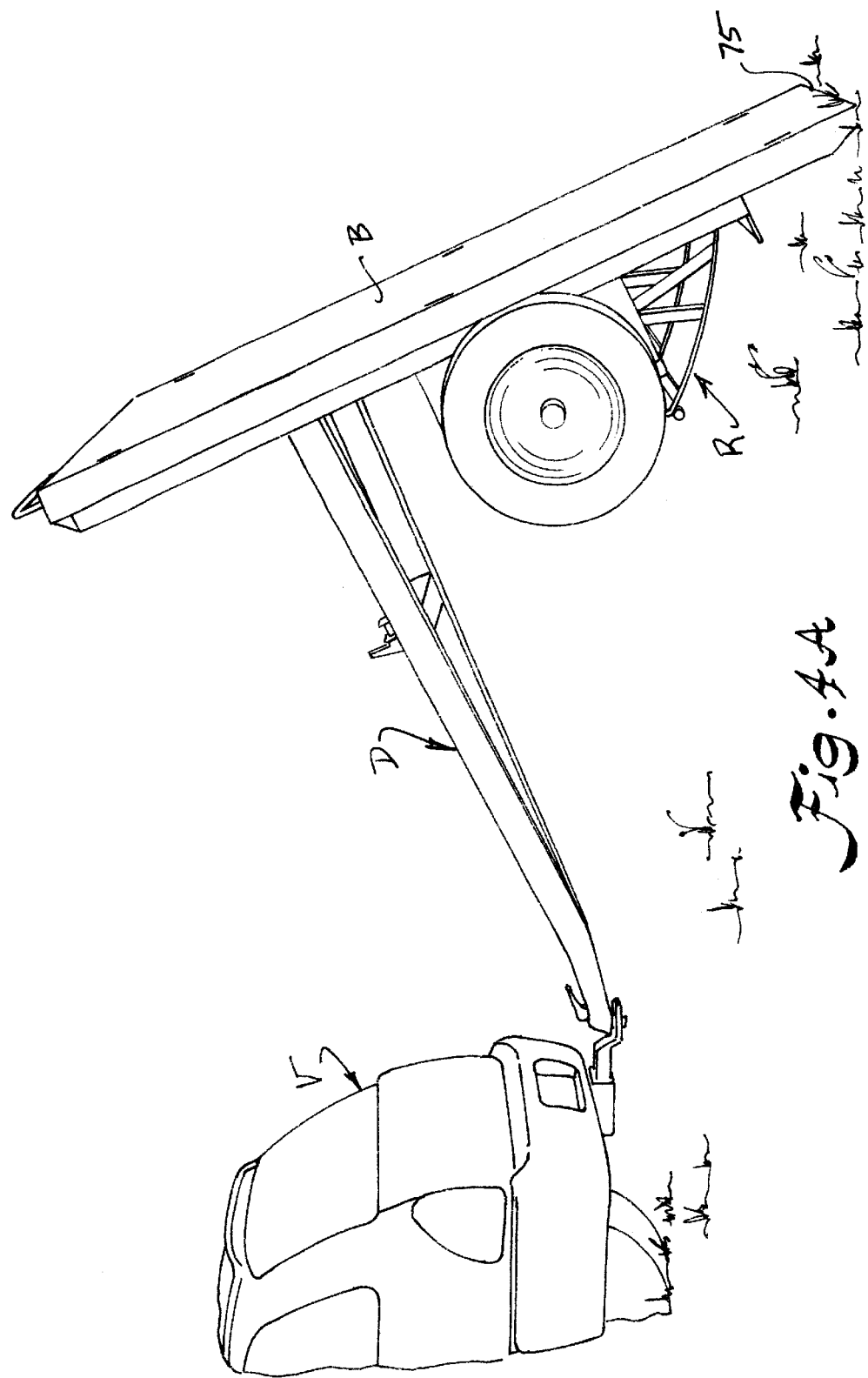

TRAILER WITH TILTING BED

BACKGROUND OF THE INVENTION

The present invention relates to trailer having a bed or box which automatically tilts, or dumps, upon the trailer being moved rearwardly.

Tilting, or dump, trailers are trailers which have a bed or body portion configured for carrying cargo and for tilting in order to offload, or dump the cargo. Dumping trailers are useful in that they offer a cargo-emptying feature without requiring a dedicated vehicle, such as a dump truck. A dump trailer can be used as needed by attaching it to a tow vehicle, such as a conventional truck, tractor, pick-up truck, sport utility vehicle (SUV), automobile, etc. Once the desired cargo has been hauled and dumped using the trailer, the trailer could then be detached from the tow vehicle, and the tow vehicle is then unencumbered and free to be used for other purposes.

In conventional dump trailers, the dumping mechanism is powered by a separate power source, such as a hydraulic or electric lift mechanism. Such mechanism adds weight and expense to the trailer, and also complexity. However, such a power mechanism is oftentimes required due to the weight of the load in the trailer, the load being prohibitively heavy for allowing the trailer to be tilted upwardly and dumped by hand.

Various types of dump trailers have been patented. U.S. Pat. No. 3,189,387, issued Nieto, Jr., discloses eccentric rim members which are mounted in front of trailer wheels, and which rotate in a manner that lifts the trailer into a dumping position as a trailer is pulled forwardly. U.S. Pat. No. 6,238,166 B1, issued to Collier, discloses a utility trailer with selectively deployable chains. Upon deployment of the chains and backing of the trailer, the tires engage the chain, and the trailer moves into a dumping position.

U.S. Pat. No. 5,544,944, issued to Keech; U.S. Pat. No. 4,711,499, issued to Fortin; U.S. Pat. No. 1,894,320, issued to Muchenberger-Wittlinger; and U.S. Pat. No. 4,511,181, issued to Schantz, all disclose tilting trailers that pivot at the end of a tow bar. In particular, the Keech patent discloses uses of a tilt lock mechanism, and the Fortin patent discloses a sliding hinge for dumping upon rearward movement. The Schantz patent allows for storage of a trailer in a vertical position.

Another desirable feature in a dump trailer is to provide a trailer which does not have to be detached from the tow vehicle in order to perform the dumping operation. Additionally, if such dumping could take place without requiring a separate, powered mechanism, such would be a further advantage.

SUMMARY OF THE INVENTION

It is, therefore, an object of the present invention to provide a tilting, or dumping, trailer which does not require an auxiliary power unit or other power mechanism in order to perform the dumping function.

Another object of the present invention is to provide a dumping trailer which may remain attached to a tow vehicle during a dumping operation.

A further object of the present invention is to provide a dumping trailer which may be dumped automatically by backing up the tow vehicle, with the trailer attached thereto.

A still further object of the present invention is to provide a dumping trailer which, after being moved to the dumping position, may be returned to its normal, cargo-hauling position, by pulling the tow vehicle forward.

Yet another object of the present invention is to provide a dumping trailer which may be tilted to a vertical position, and beyond vertical, during the dumping operation.

A still further object of the present invention is to provide a method of operating a dumping trailer.

Yet another object of the present invention is to provide a dumping trailer, wherein the dumping feature may be activated and deactivated by the user from the front-end of the trailer.

Generally, the present invention includes a trailer having a draw bar and coupler for attachment to a hitch of a tow vehicle, the trailer comprising a bed connected to a frame for pivotal movement with respect to the draw bar. The bed or other load carrying structure is movable between a generally horizontal, hauling position and a tilted, dumping position. The bed includes a forward portion adjacent the draw bar and a rearward portion opposite the forward portion. An axle is connected to the frame to which wheels are attached. Blocking members contact the axle as the tow vehicle moves rearwardly, the blocking members being movable between a blocking position, for contacting the ground to substantially block rearward movement of the frame as the trailer is moved rearwardly, and a retracted position, wherein the blocking members are substantially out of contact with the ground. Upon the blocking member being moved to the blocking position and the bed being in the hauling position, and upon the trailer being moved rearwardly, the bed pivots to the dumping position.

More specifically, the present invention includes a method of tilting a trailer and a tilting/dumping trailer having a mechanism wherein the blocking members are preferably stands having rocker portions thereon, the stands being pivotally attached to the trailer behind the trailer's wheels. The stands are normally maintained in an upward position so as to provide adequate ground clearance for the trailer during use. When it is desired to dump the trailer, the user, from the front-end of the trailer, activates the stands to allow them to pivot downwardly for contact with the ground.

Activation of the stands is accomplished through use of a release mechanism, such as a chain and pin arrangement, or through the use of a linkage, straps, or the like, which preferably allow the stands to be released by the user, as mentioned above, while the user stands at the forward end of the trailer.

Locking mechanisms are provided which engage a forward portion of the trailer, and these locking mechanisms, in a preferred embodiment, are locking spring pushpins. These pushpins are released in order to allow the trailer bed to pivot with respect to the draw bar of the trailer. Once the stands have been lowered to the ground, upon backing up of the vehicle, the stands act as fulcrums about which the bed pivots, and actually cause the wheels of the trailer to be lifted off of the ground during backing. As the wheels are lifted off of the ground, the stands bear the weight of the trailer and its load. This forces the stands downwardly to substantially fix them from sliding with respect to the ground as the trailer is backed up. Upon continued backing of the vehicle, the trailer bed will begin tilting upwardly, and this allows for the contents of the trailer to be dumped.

It should be noted that as the bed tilts, its rear edge contacts the ground, and at this point, the bed itself becomes a ramp for allowing riding mowers, all terrain vehicles, go carts, tractors, etc. to be driven or otherwise loaded onto bed, if desired.

In order to return the trailer cargo bed back down to its normal position, the tow vehicle is moved forward such that the draw bar of the trailer pulls the trailer forward, thereby pivoting the trailer bed to a generally horizontal position. At this point, the wheels of the trailer may move freely, and the stands may be retracted, again, preferably from the front of the trailer, in order to prevent the stands from dragging on the ground during use of the trailer.

The trailer of the present invention includes a draw bar having a unique configuration which allows the trailer to be dumped without requiring it to be unhitched from the tow vehicle. This is allowed by virtue of the geometry of the draw bar, which includes angled portions for allowing the trailer to be moved to the dumping position, and returned to the normal, home, position while still hitched to the tow vehicle.

Accordingly, the trailer of the present invention requires no powered dumping mechanism, auxiliary or otherwise. This eliminates the need for power supply mechanisms, which are generally power take-off (PTO) hydraulic mechanisms, drawing motive power from the tow vehicle, or electric-hydraulic mechanisms, which require use of an electrically-powered hydraulic pump.

Further, typical dump trailers, because of their need for separate power devices for performing the dumping operation, must generally include increased structural support for supporting such dump mechanisms, which in turn adds weight and cost to the trailer. This weight and cost is in addition to that of the powered dumping system itself.

The trailer of the present invention, by eliminating the need for a powered dumping mechanism, can be made to be relatively lightweight and easy to move around by hand, thereby allowing enhanced maneuverability of the trailer in tight areas.

Because the trailer of the present invention requires no additional power source, such as an electrical hook-up or a hydraulic power take-off, to connect to the tow vehicle's PTO system, the trailer can be used with almost any vehicle having an ordinary trailer hitch.

Moreover, by virtue of the design of the trailer of the present invention, the bed of the trailer is preferably elevated, compared to other trailers, thereby allowing easy access at the rear and sides for loading or off-loading with conventional lift trucks, such as forklifts, making the trailer attractive for use to business owners and, in particular, to the construction industry.

BRIEF DESCRIPTION OF THE DRAWINGS

The foregoing, as well as other objects of the present invention, will be further apparent from the following detailed description of the preferred embodiment of the invention, when taken together with the accompanying specification and the drawings, in which:

FIG. 4A is a perspective view, from the side, illustrating a trailer constructed in accordance with the present invention at an intermediate dumping position;

DESCRIPTION OF THE PREFERRED EMBODIMENT

Figure 1:
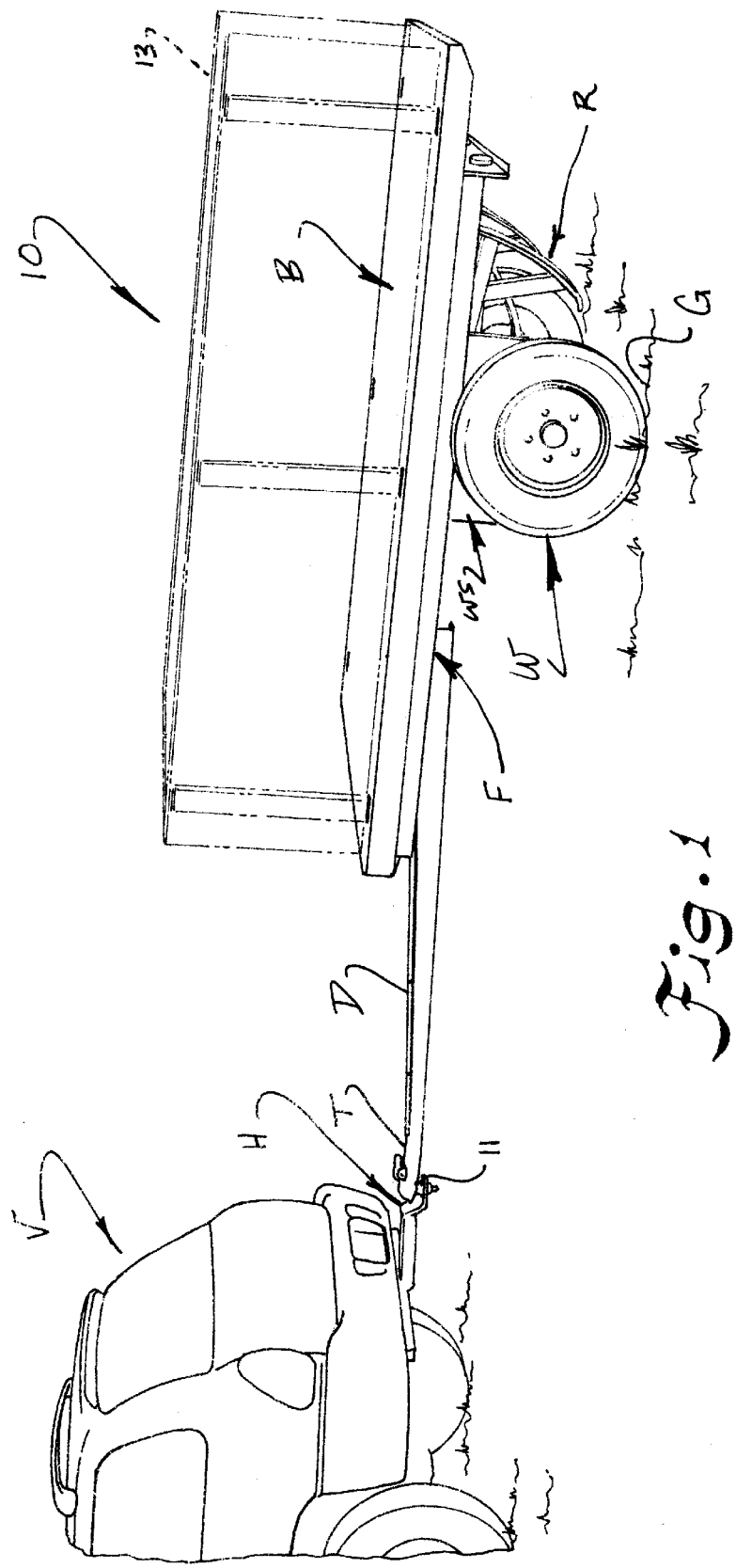
FIG. 1 is a perspective view of a trailer constructed in accordance with the present invention, connected to a tow vehicle.

The accompanying drawings and the description which follows set forth this invention in its preferred embodiment. However, it is contemplated that persons generally familiar with trailers will be able to apply the novel characteristics of the structures illustrated and described herein in other contexts by modification of certain details. Accordingly, the drawings and description are not to be taken as restrictive on the scope of this invention, but are to be understood as broad and general teachings.

Referring now to the drawings in detail, wherein like reference characters represent like elements or features throughout the various views, the tilting/dumping trailer of the present invention is indicated generally in the figures by reference character 10.

Turning to FIG. 1, the trailer 10 of the present invention is shown attached to a trailer hitch H of a tow vehicle V. Trailer 10 is shown in FIG. 1 in its operational position, for use in hauling cargo or other materials.

Figure 6:
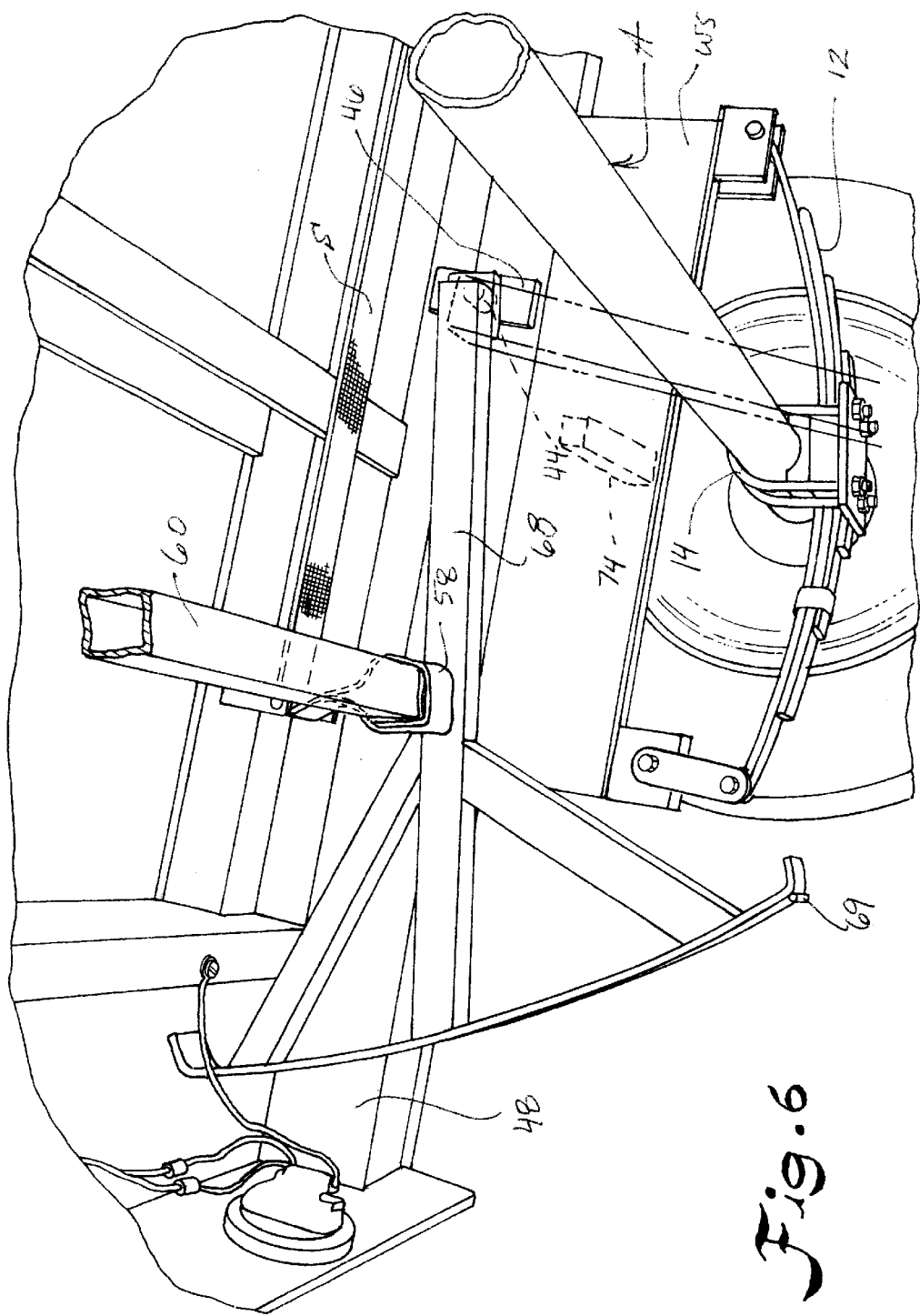
FIG. 6 is a partial perspective view of a stand and stand release mechanism constructed in accordance with the present invention.

Trailer 10 includes, generally, a draw bar, generally D, having a coupler, or tongue, generally T, attached to a conventional ball hitch 11 of the tow vehicle. Draw bar D is connected to a frame structure, generally F, of trailer 10 to which load carrying structure, such as a bed, generally B, is attached for carrying cargo or other items. It is to be understood that the load carrying portion of trailer 10 could be of a variety of configurations, depending on the shape and characteristics of the load being carried. For example, a stake-side box structure 13, shown by dotted lines in FIG. 1, could be provided bed B to form a cargo compartment, if desired. Alternately, the load carrying portion could have rails or some other framework (not shown) specially configured for drums, roll-on/roll-off cargo, etc. Also connected to frame F is a wheel support structure, generally WS, to which wheels, generally W, are attached for rotation. Wheels W are attached to spindles (not shown), which are in turn attached to an axle, generally A (FIGS. 3B, 4B, and 6). Axle A is attached to leaf springs, generally 12, via U-shaped bolts, 14.

Draw bar D is pivotally attached to frame F forward of axle A, as shown in FIGS. 3B and 4B, by pins, or bolts, 16, which are attached to a flange 18 provided on the rearward ends of draw bar D. The pivotal attachment of draw bar D to frame F allows for relative movement of frame F, and accordingly, bed B, with respect to draw bar D.

Figure 2:
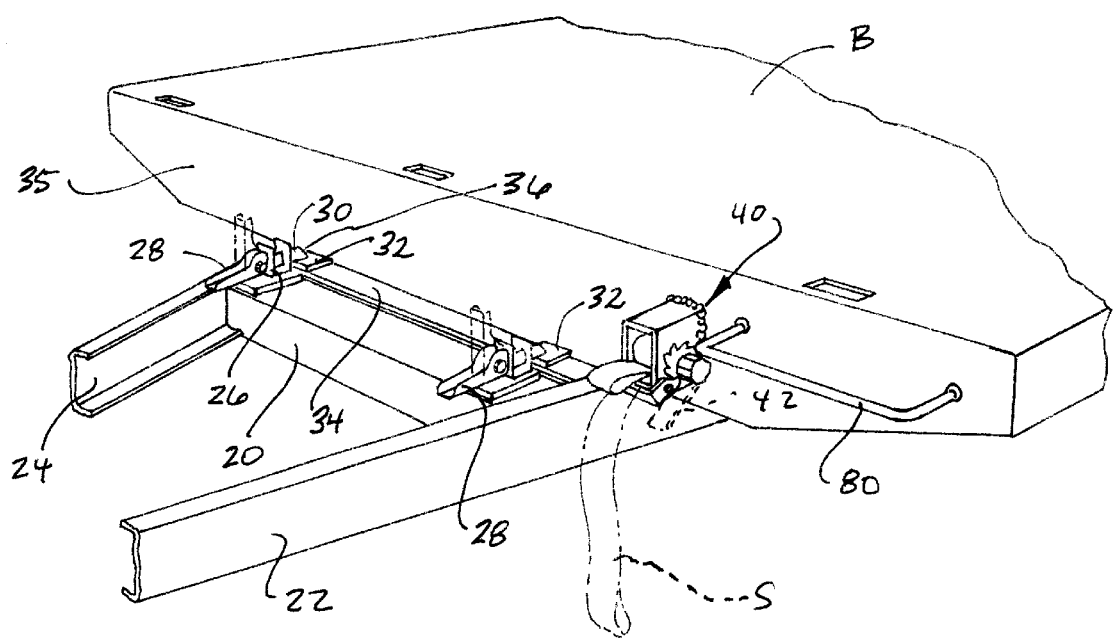
FIG. 2 is a partial perspective view of the forward end of the trailer illustrated in FIG. 1.

As shown in FIG. 2, latches, L, are provided on a cross member 20 spanning between rails 22, 24 of draw bar D. Rails 22, 24 are angled slightly upwardly from tongue T towards frame F. Latches L are pivotally connected to brackets 26 attached to cross member 20 and include a lever portion 28 which, when moved to a first position, forces a pin 30 outwardly to engage with a stop member 32 carried on a lip 34 on the forward end 35 of bed B. When lever 28 is moved to another position, shown in dotted lines in FIG. 2, the pin 30 is retracted and clears lip 34. This allows frame F and bed B to be moved upwardly from draw bar D, as trailer 10 is tilted.

Latches L are preferably spring-loaded, and could be of conventional design, and include pins 30 having an incline face 36 at the extreme end thereof. This allows, upon lip 34 moving downwardly into contact with faces 36 of pins 30 to automatically force pins 30 rearwardly temporarily as lip 34 moves downwardly past pins 30. Once lip 34 clears pins 30, pins 30 then spring back into their normal position above stops 32 of lip 34 in order to retain bed B in its "home" position, ready for use for hauling.

Also provided on a forward end of bed B is a strap ratchet mechanism, generally 40, for a strap S. Ratchet mechanism 40 allows for strap S to be wound up into a roll on ratchet mechanism 40 for tightening strap S. Ratchet mechanism 40 can be of conventional design, and can be activated using an ordinary ratchet wrench tool. Preferably, ratchet mechanism 40 uses its own built-in lever 42 for actuating the ratchet mechanism. In order to release strap S, the ratchet lever 42, or another portion of the ratchet mechanism 40 is manipulated to allow strap S to be freely moved with respect to ratchet mechanism 40. It is to be understood that a variety of different devices could be used to raise and lower stand, or, rocker devices R other than the strap mechanism shown.

The need for the free movement of strap S becomes apparent when it is desired to tilt, or dump, bed B of trailer 10 together with the cargo or other material carried on bed B.

Figure 3A:
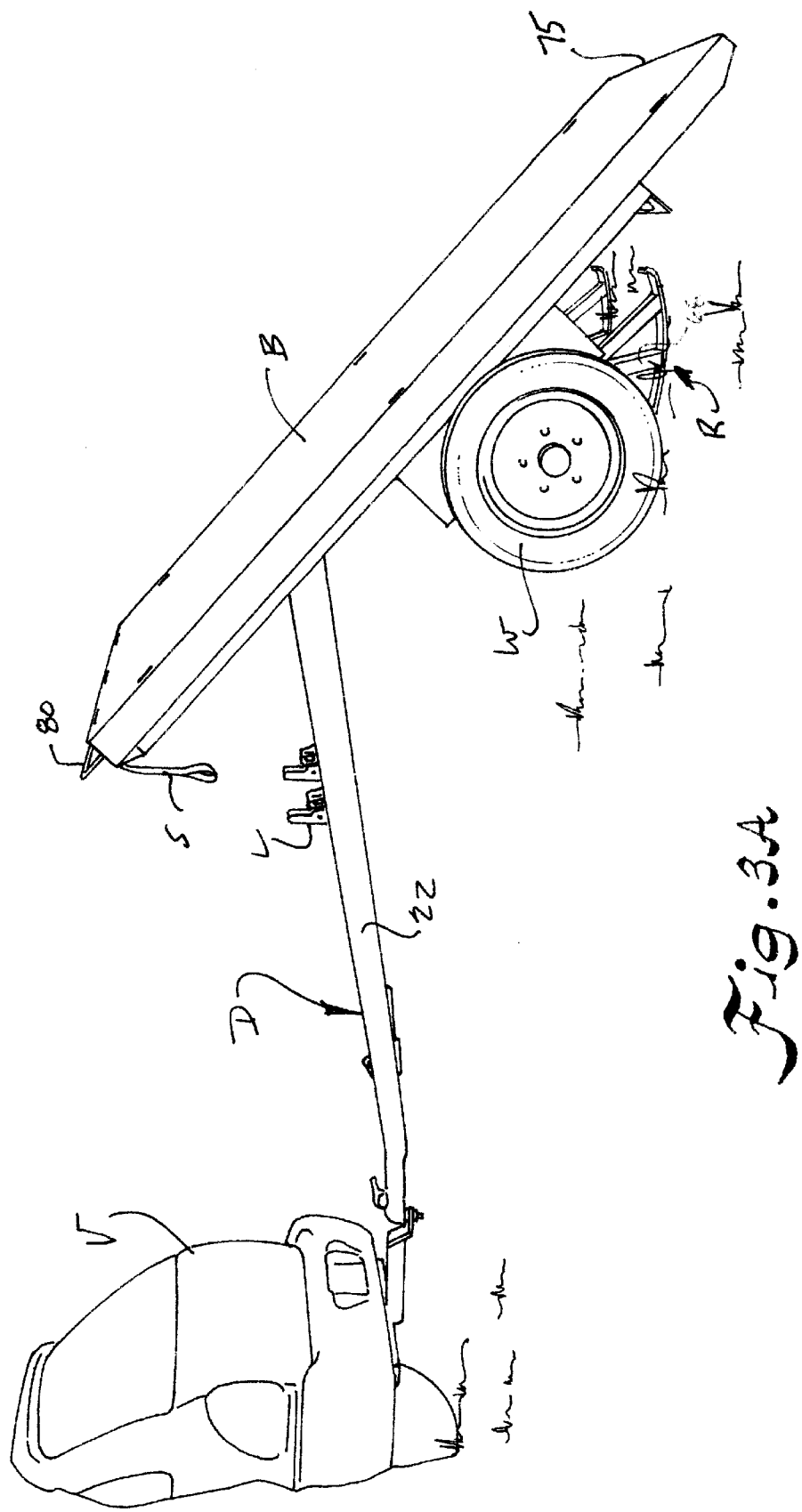
FIG. 3A is a perspective view, from the side, of a trailer constructed in accordance with the present invention at the initiation of the dumping sequence.
Figure 3B:
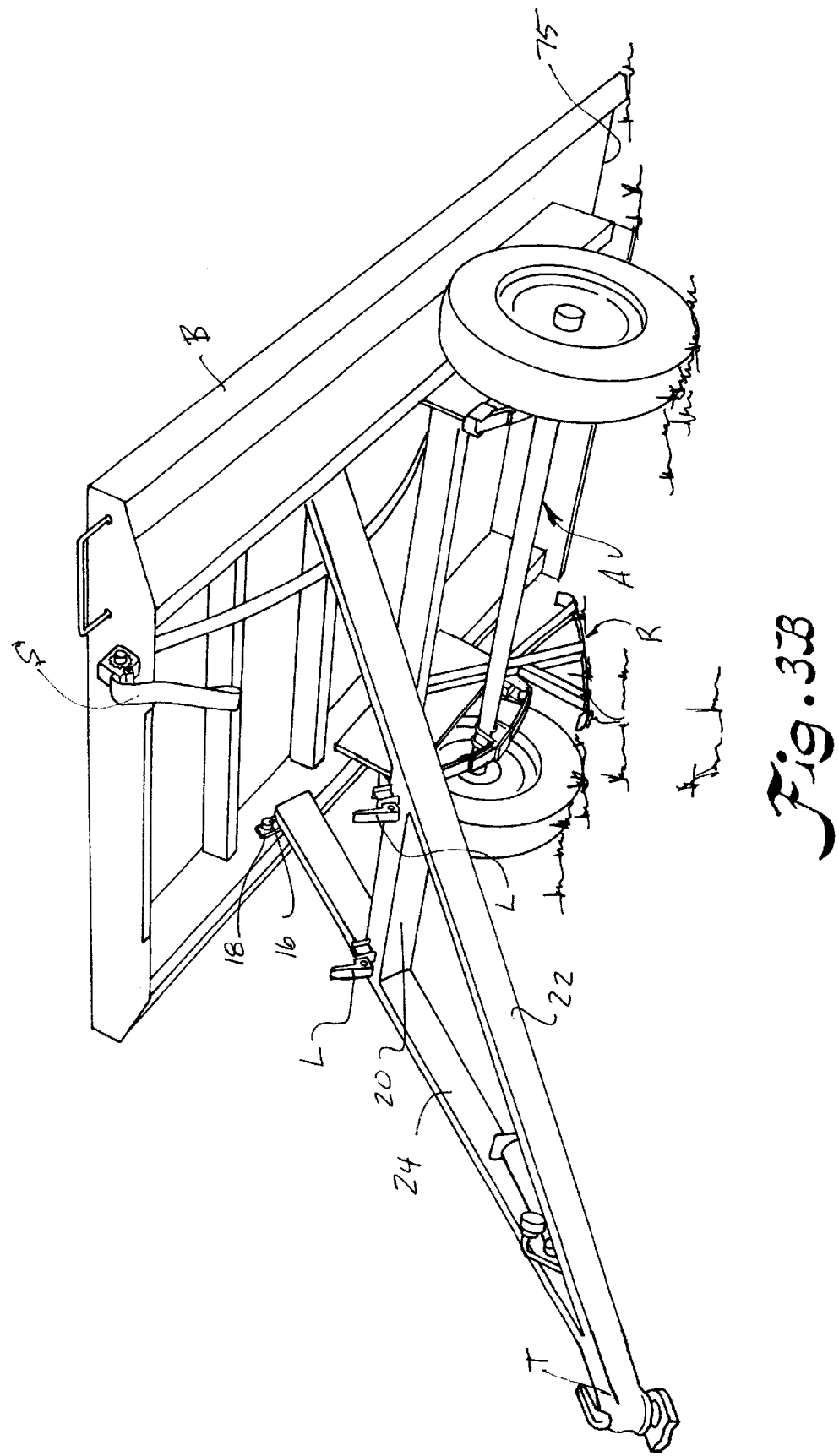
FIG. 3B is a forward perspective view of a trailer constructed in accordance with the present invention at the initiation of the dumping sequence.
Figure 4B:
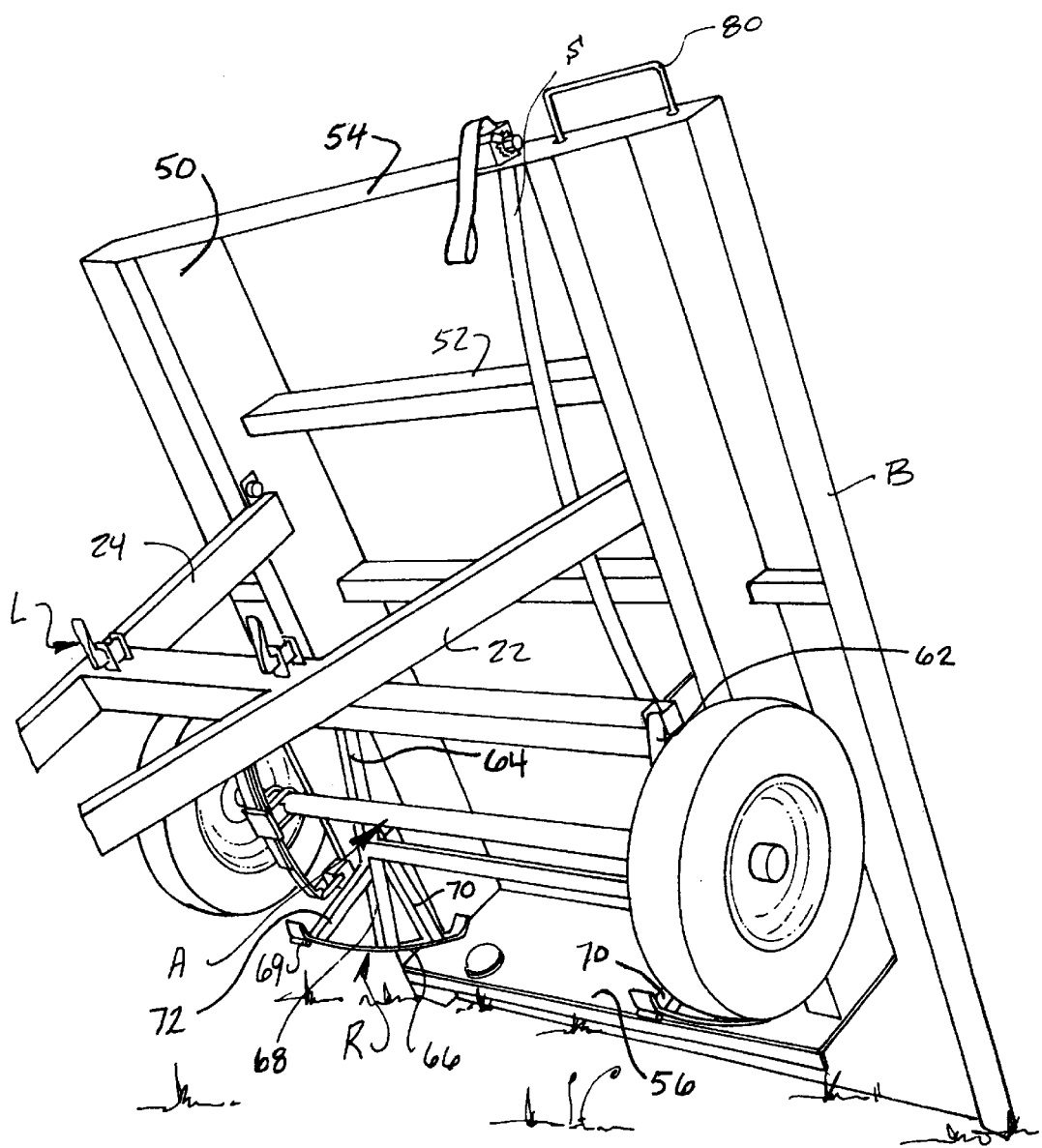
FIG. 4B is a perspective view, from the front, illustrating a trailer constructed in accordance with the present invention at an intermediate dumping position.

Turning to FIGS. 3A and 3B, bed B is shown at the initiation of the tilting sequence of trailer 10. From FIGS. 3A and 3B, it can be seen that the levers 42 of latches L have been moved to the position for retracting pins 30, thereby allowing lip 34 to be raised above draw bar D. Once the operator has moved latches L to this position, bed B is free to tilt with respect to draw bar D. At the same time, the ratchet mechanisms 40 is activated to release strap S. Strap S is, at its end opposite that of ratchet mechanism 40, connected to a blocking device, such as a stand, or rocker, assembly, generally R.

As shown more clearly in FIG. 6, stand, or rocker, device R is pivotally attached to frame F by a pivotal connector, such as a pin or bolt 44, attached to a bracket 46, which is connected to longitudinally extending side rails 48, 50, of frame F. It is noted here, that frame F includes transversely extending support members, generally 52, and front and rear transverse members, generally 54, 56. Strap S includes a loop 58 which encircles a cross bar 60 connecting two stand, or rocker, assemblies 62, 64, to one another, such that the rocker assemblies 62, 64 move in unison with one another.

Although not shown, a simple crank arrangement could be used, or chains could be attached to the rocker mechanisms R, and the chains could be taken in or let out in order to raise or lower mechanisms R.

By releasing strap S, rocker assemblies 62, 64 pivot downwardly due to their own weight such that the curved, "rocker" member 66 of each rocker assembly 62, 64, contacts the ground, generally G. It is to be understood that as used herein, ground G refers to any surface on which trailer 10 may travel, including, but not limited to, soil, pavement, gravel, rock, brick, block, grass, concrete, vegetation, etc.

Rocker assemblies 62, 64 each include a rigid leg 68 attached to rocker portions 66, and two buttress members 70, 72, which are each at one end thereof connected to a rocker portion 66, and at the other end thereof, connected to leg 68.

Leg 68 of rocker assembly 62 is shown at its lowered, operational position, by dotted lines in FIG. 6, leg 68 being in a position to contact and block rearward movement of axle A.

As shown in FIGS. 4B, 5B, and 6, the bottom surface of rocker devices R could be provided a with rib 69 or ridges (not shown), or some other textured profile in order to facilitate the rocker portion 66 gaining purchase on the ground or pavement as trailer 10 is pushed rearwardly during the dumping operation. The ribbed profile on the rocker portion 66 also assist the rocker devices R gaining purchase in situations where the trailer is on gravel, stone, or other loose soil conditions.

Bed B is preferably at an elevation such that it may extend outwardly over wheels W. The underside of bed B thus effectively acts as a fender for wheels W during use. The raised height of bed B facilitates loading and off-loading of trailer 10 using forklifts, or other lifting equipment, and also provides a more comfortable height for loading and unloading of cargo by hand.

Although the rocker devices R are shown being attached forwardly of axle A, such is not required, and the rocker assemblies 62, 64 could be pivotally connected to a position rearward of axle A, if desired.

As shown in FIG. 6, instead of rocker legs 68 abutting axle A during backing of trailer 10, in order to cause tilting of trailer 10, one or more outwardly projecting stops 74 could be added to frame F, against which legs 68 would bear during the tilting operation. This would reduce the stress upon axle A, which itself is a stop, as legs 68 would not bear against it, but would instead bear against the stop 74 during tilting. It is to be understood that stops 74 could be of a variety of configurations and are not to be limited to the stops shown in the drawings. For example, such stops could be in the form of a slot, detent, recess, etc. (none shown), if desired, without departing from the teachings and disclosure of the present invention.

In operation, in order for trailer 10 to have its bed B tilted, and the contents thereon dumped, latches L would first be moved to the release position, such that they no longer engage the lip 34 on the front of trailer bed B. Also, ratchet mechanism 40 would be actuated to release strap S, such that strap S is payed out of ratchet mechanisms 40. This causes rocker devices R to pivot downwardly from their normal, home position, tucked up under trailer bed B, into contact with the ground. Tow vehicle V would then be backed up, and rocker devices R would contact axle A (or, if stops 74 are used, thereagainst).

Figure 5A:
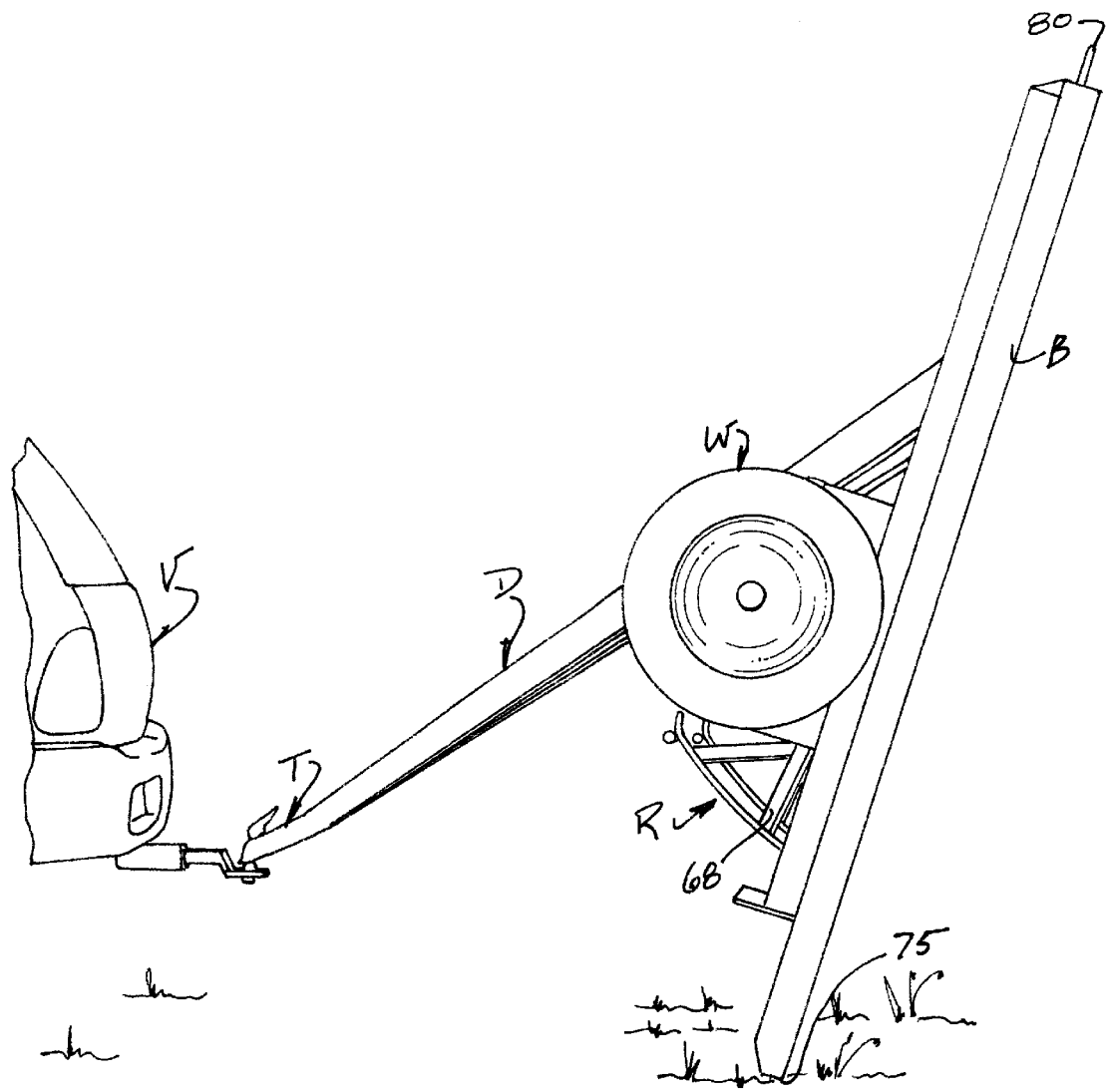
FIG. 5A is a perspective view, from the side, illustrating a trailer constructed in accordance with the present invention, wherein the trailer bed has been moved o a position beyond vertical, while still being attached to the tow vehicle.

Continued backing of tow vehicle V would cause rocker devices R to act as fulcrums about which bed B pivots, causing the forward end of bed B to tilt upwardly (FIGS. 3A and 3B) as the angled rails of draw bar D deliver an upward force against frame F. The angle of tilt of bed B would continue to increase as tow vehicle V is moved rearwardly. As bed B tilts, the rocker devices R are lifted from the ground (FIGS. 4A and 4B), and the bed B rests on rear edge 75. Bed B would become vertical during continued backing, and could even tilt beyond vertical, as shown in FIG. 5A, if desired. Note that even when the bed is tilted backwardly beyond vertical, tongue T remains engaged and connected to hitch H of tow vehicle V. At this point, any unrestrained cargo or items on bed B would likely be dumped.

In order to return bed B to its home position, tow vehicle V would be pulled forward, and in so doing, draw bar D would be pulled forward, and would pull downwardly on bed B. Continued forward motion of tow vehicle V would eventually cause bed B to return to its home position and become automatically locked to frame F using latches L, as discussed above.

Note also that in FIG. 2, a handle 80 may be provided on the forward end of bed B to allow the user to pull bed B back to its home position through grasping of handle 80, if desired.

An important feature of trailer 10 is that in order to assist in the dumping of the load carrying portion, or bed B, especially when a heavy load is being carried, rocker devices R actually cause wheels W to be lifted off of the ground during dumping. By causing the weight of trailer 10 to be essentially borne by rocker devices R, the rocker devices R are less apt to slide during backing up of the tow vehicle V, since the friction forces working against the sliding of rocker devices R is significantly increased. By substantially fixing movement of the rocker devices R during backing, the draw bar forces the forward portion of bed B upwardly, causing bed B to tilt. If the rocker devices R did not become generally stationary during backing, the wheels W would continue to roll rearwardly, preventing the desired tilting of bed B.

EXAMPLE

Although the present invention is not to be limited in any manner by the following, in one preferred embodiment, a trailer 10, constructed of steel, and having a nine foot by seven foot bed B and the following dimensions, has been constructed in accordance with the teachings of the present invention.

The combined length of draw bar D and tongue T was approximately 96 inches, and the distance between the forward edge of bed B to the centerline of axle A was approximately 61 inches; to the pivot point of draw bar D, approximately 40.78 inches; and to axle A, approximately 81.22 inches. The length of legs 68 is approximately 29 inches, and it is approximately 15.78 inches from the pivot points of legs 68 to the pivot point of draw bar D.

From the foregoing, it can be seen that the present invention provides a tilting trailer which can be of lightweight efficient design, and which does not require it's own dedicated lift mechanism for dumping the trailer's contents.

While preferred embodiments of the invention have been described using specific terms, such description is for present illustrative purposes only, and it is to be understood that changes and variations to such embodiments, including but not limited to the substitution of equivalent features or parts, and the reversal of various features thereof, may be practiced by those of ordinary skill in the art without departing from the spirit or scope of the following claims.

What is claimed is:

1. A trailer, comprising:
a load carrying portion;
a draw bar connected to said load carrying portion;
said load carrying portion connected to said draw bar for pivotal movement with respect to said draw bar;
a stop carried by said trailer; and
a blocking member configured to contact said stop as said trailer moves rearwardly, said blocking member movable between a blocking position, for contacting the ground to substantially block rearward movement of said load carrying portion as said trailer is moved rearwardly, and a retracted position, wherein said blocking member is substantially out of contact with the ground, whereby upon said blocking member being moved to said blocking position, and said trailer being moved rearwardly, said blocking member acts as a fulcrum about which said load carrying portion pivots, and said load carrying portion is tilted upwardly with respect to said draw bar.

2. A trailer comprising:
a load carrying portion;
a draw bar connected to said load carrying portion;
said load carrying portion connected to said draw bar for pivotal movement with respect to said draw bar;
an axle connected to said load carrying portion, and wheels connected to said axle; and
a blocking member for contacting said axle as said trailer moves rearwardly, said blocking member movable between a blocking position, for contacting the ground to substantially block rearward movement of said load carrying portion as said trailer is moved rearwardly, and a retracted position, wherein said blocking member is substantially out of contact with the ground, whereby upon said blocking member being moved to said blocking position, and said trailer being moved rearwardly, said blocking member acts as a fulcrum about which said load carrying portion pivots, and said load carrying portion is tilted upwardly with respect to said draw bar.

3. A trailer as set forth in claim 1, wherein said blocking member is pivotally connected to said load carrying portion for pivotal movement between said blocking position and said retracted position.

4. A trailer as set forth in claim 1, wherein said blocking member is elongated and includes a generally transversely extending portion for contacting the ground.

5. A trailer as set forth in claim 1, wherein said blocking member is elongated and is pivotally connected at one end to said load carrying portion for pivotal movement between said blocking position and said retracted position, and wherein another end of said blocking member includes a rocker portion for contacting the ground upon said blocking member being in said blocking position.

6. A trailer comprising:
a load carrying portion;
a draw bar connected to said load carrying portion;
said load carrying portion connected to said draw bar for pivotal movement with respect to said draw bar;
an axle connected to said load carrying portion, and wheels connected to said axle; and
a blocking member for contacting said axle as said trailer moves rearwardly, said blocking member being pivotally connected to said load carrying portion forwardly of said axle for pivotal movement between a blocking position, for contacting the ground to substantially block rearward movement of said load carrying portion as said trailer is moved rearwardly, and a retracted position, wherein said blocking member is substantially out of contact with the ground, whereby upon said blocking member being moved to said blocking position, and said trailer being moved rearwardly, said blocking member acts as a fulcrum about which said load carrying portion pivots, and said load carrying portion is tilted upwardly with respect to said draw bar.

7. A trailer as set forth in claim 1, further comprising an axle connected to said load carrying portion, and wheels connected to said axle, and wherein said load carrying portion pivots about an axis forward of said axle.

8. A trailer as set forth in claim 1, further comprising means for selectively moving said blocking member between said blocking position and said retracted position.

9. A trailer comprising:

a load carrying portion;

a draw bar connected to said load carrying portion;

said load carrying portion connected to said draw bar for pivotal movement with respect to said draw bar;

a stop carried by said trailer;

a blocking member for contacting said stop as said trailer moves rearwardly, said blocking member movable between a blocking position, for contacting the ground to substantially block rearward movement of said load carrying portion as said trailer is moved rearwardly, and a retracted position, wherein said blocking member is substantially out of contact with the ground, whereby upon said blocking member being moved to said blocking position, and said trailer being moved rearwardly, said blocking member acts as a fulcrum about which said load carrying portion pivots, and said load carrying portion is tilted upwardly with respect to said draw bar; and an elongated flexible member connected to said blocking member, and a ratchet mechanism for selectively reeling in said elongated flexible member, such that said blocking member is moved to said retracted position, and paying out said elongated flexible member, such that said blocking member moves to said blocking position; and wherein said load carrying portion includes a forward portion adjacent said draw bar and said ratchet mechanism being connected to said forward portion of said load carrying portion.

10. A trailer as set forth in claim 1, further comprising a body portion attached to said load carrying portion for forming a generally box-shaped cargo compartment.

11. A trailer as set forth in claim 1, further comprising locking means connected to said draw bar for selectively locking said load carrying portion with respect to said draw bar.

12. A trailer as set forth in claim 1, wherein said stop is connected to said load carrying portion.

13. A trailer comprising:

a load carrying portion;

a draw bar connected to said load carrying portion;

said load carrying portion connected to said draw bar for pivotal movement with respect to said draw bar;

a stop carried by said trailer;

a blocking member for contacting said stop as said trailer moves rearwardly, said blocking member movable between a blocking position, for contacting the ground to substantially block rearward movement of said load carrying portion as said trailer is moved rearwardly, and a retracted position, wherein said blocking member is substantially out of contact with the ground, whereby upon said blocking member being moved to said blocking position, and said trailer being moved rearwardly, said blocking member acts as a fulcrum about which said load carrying portion pivots, and said load carrying portion is tilted upwardly with respect to said draw bar; and means for remotely causing movement of said blocking member between said retracted position and said blocking position.

14. A trailer as set forth in claim 1, further comprising an additional blocking member, said blocking member being positioned on one side of said load carrying portion and said additional blocking member being positioned on another side of said load carrying portion, and a linking member connected between said blocking member and said additional blocking member, such that said blocking member and said additional blocking member move generally in unison with one another between a blocking position and a retracted position.

15. A trailer for carrying a load, the trailer being for attachment to a hitch of a tow vehicle, the trailer comprising:

a load carrying portion;

wheels connected to said load carrying portion for carrying the trailer on the ground;

a draw bar;

said load carrying portion connected to said draw bar for pivotal movement with respect to said draw bar; said load carrying portion being movable between a generally horizontal, hauling position and a tilted, dumping position; said load carrying portion having a forward portion adjacent said draw bar and a rearward portion opposite said forward portion;

an axle connected to said load carrying portion, said wheels being connected to said axle;

at least one rigid blocking member for contacting said axle as the tow vehicle moves rearwardly, said blocking member being movable between a blocking position, for contacting the ground to substantially block rearward movement of said load carrying portion as the trailer is moved rearwardly, and a retracted position, wherein said blocking member is substantially out of contact with the ground, whereby, upon said blocking member being moved to said blocking position and said load carrying portion being in said hauling position, and upon said trailer being moved rearwardly, said load carrying portion pivots to said dumping position;

said blocking member being configured to support a substantial portion of the weight of said trailer as said load carrying portion is pivoted between said hauling and dumping positions;

said load carrying portion being configured such that said rearward portion of said load carrying portion contacts the ground and supports a substantial portion of the weight of said trailer upon said load carrying portion being in said dumping position; and said load carrying portion being configured such that said wheels are lifted off the ground upon said load carrying portion being in said dumping position; and locking means connected to said load carrying portion for selectively fixing said load carrying portion in said hauling position.

16. A trailer as defined in claim 15, wherein upon said load carrying portion being in said dumping position, and while said trailer remains attached to the hitch of the tow vehicle, said forward portion of said load carrying portion is above and projects rearwardly of said rearward portion of said load carrying portion.

17. A trailer for carrying a load, the trailer comprising:

a load carrying portion;

wheels connected to said load carrying portion for carrying the trailer on the ground;

a draw bar;

said load carrying portion connected to said draw bar for pivotal movement with respect to said draw bar; said load carrying portion being movable between a generally horizontal, hauling position and a tilted, dumping position;

a stop connected to said load carrying portion;

at least one blocking member configured for contacting said stop as the trailer moves rearwardly, said blocking member being movable between a blocking position, for contacting the ground to substantially block rearward movement of said load carrying portion as the trailer is moved rearwardly, and a retracted position, wherein said blocking member is substantially out of contact with the ground, whereby, upon said blocking member being moved to said blocking position and said load carrying portion being in said hauling position, and upon said trailer being moved rearwardly, said load carrying portion pivots to said dumping position;

said blocking member being configured to support a substantial portion of the weight of said trailer as said load carrying portion is pivoted between said hauling and dumping positions; and said load carrying portion being configured such that said wheels are lifted off the ground upon said load carrying portion being in said dumping position.

* * * * *